United States Patent [19]
Lingg

[11] 3,756,436
[45] Sept. 4, 1973

[54] CONVEYOR TRACK FOR PALLETS
[75] Inventor: Gerhard Lingg, Leimen, Germany
[73] Assignee: Mannesmann Aktiengesellschaft, Dusseldorf, Germany
[22] Filed: July 17, 1972
[21] Appl. No.: 272,446

[52] U.S. Cl. ............... 214/41, 53/163, 193/35 SS, 214/6 F, 214/310
[51] Int. Cl. ............................................. B65g 57/00
[58] Field of Search ...................... 214/6 P, 6 F, 41, 214/310; 193/35 SS; 198/127

[56] References Cited
UNITED STATES PATENTS
3,578,184    5/1971   Schaich............................ 214/310 X
3,690,485    9/1972   Fischer et al. ................... 214/310 X Primary Examiner—Robert G. Sheridan
Attorney—Ralf H. Siegemund

[57] ABSTRACT

A track system for air freight is disclosed, having a short track of narrowly-spaced rollers and a long, principal track of widely-spaced rollers at a lower level. A transition station has rollers of both types of roller spacings, the rollers being organized in two sets, and respectively alignable with the two tracks. Auxiliary carriers of perforated construction are used in the wide-spaced track, and the narrow-spaced rollers in the station can reach through the perforations for lowering the load onto an auxiliary carrier which is supported by widely-spaced rollers; the load-bearing carrier is then rolled onto that track.

6 Claims, 4 Drawing Figures

CONVEYOR TRACK FOR PALLETS

BACKGROUND OF THE INVENTION

The present invention relates to improvements in conveyor systems and to the construction of a track system to be used for transporting pallets, containers or the like in an airport freight terminal. The track to be constructed and to be improved in accordance with the invention possesses a conveyor facility of the roller track variety with a longitudinal array of support elements such as rolls or rollers. The objects to be transported will be called pallets in the following description, but it is understood that other objects such as containers, pieces of freight, etc., can be transported analogously.

The known roller tracks are usually comprised of rather closely spaced rolls or rollers. It was found difficult to construct a conveyor track enabling pallets to move thereon along a straight path. Some correction of the travel path, either manually or mechanically, was found necessary and unavoidable to prevent pallets from running off a long straight track.

The difficulty of the problem is enhanced by the fact that quite frequently objects of different dimensions are moved over the track, so that lateral guide means cannot be provided; they could accomodate only pallets of at least approximately similar width. Another problem that has arisen in known conveyor facilities relates to the affixing of encoding plates, labels, or the like.

DESCRIPTION OF THE INVENTION

It is an object of the present invention to improve conveyor tracks so that a pallet will travel on a straight track portion along a straight path permitting travel path straightening in a simple manner. It is another object of the invention to provide a new and improved conveyor track system which is more economical than the known systems and which permits computer control to accomodate plural feeder and plural distributer branches, if needed, for handling baggage and freight in a large airport.

In accordance with the present invention it is suggested to use two types of roller tracks, one with rather narrow spacing of the rolls or rollers, the other one with rather wide spacing in between its rolls and rollers. A transition station is provided interconnecting one each of the two types of tracks and having both types of rollers organized in two sets. The two sets are relatively displaceable to each other in vertical direction. Pallets are transported over the track with wide roller spacing by means of uniformly constructed auxiliary pallets or carriers which are guided along a straight path wherever such guiding is needed. Due to uniformity in their construction, simple laterally acting guide rolls can be used here. The auxiliary carrier has apertures for traversal by the rolls or rollers of the set in the transition station having narrow spacing. Each set is alignable with the respective track of corresponding roll or roller spacing, and the pallets are liftable onto a carrier, when in the station, and by means of the narrow-spaced roller set.

The conveyor track facility constructed in accordance with the invention, thus utilizes an auxiliary carrier facility, namely the auxiliary pallets or carriers, which transport the load-bearing pallets (e.g., a regular pallet, a container, etc.) over the wide-spaced roller track. The pallet to be transported may not be sufficiently stiff to be moved by and over a relatively wide-spaced roller track, but the auxiliary carrier is sufficiently stiff so that it can be moved on and along the roller track with the wide roll or roller spacing. Also, the auxiliary carrier is constructed to permit handling by means of equipment usually employed in transportation and shelfing, even though the load-bearing pallets themselves may not be suitable for such handling.

The track with wide-spaced rollers actually covers most of the desired transportation path. Clearly, the larger the path to be covered, the more pronounced is the saving, because of utilization of the considerably more economical track with wide roller spacing. Narrow or densely spaced rollers are needed only right next to the airplane loading stations as well as in the chec-in points for freight, near a warehouse, or the like. The roller tracks usually extend also into warehouses and storage depots. Upon using the auxiliary carrier also in single or plural level storage areas, the latter can likewise be constructed from wide-spaced track rollers, extending the system into the storage facility.

The term "wide-spaced roller track" is used here in a broad sense and covers not only tracks or trains with rather widely spaced rolls or rollers, but also conveyor belts or the like with spaced-apart support elements over which the belt glides or rolls. The spacing of these support elements is usually quite narrow; presently, however, employment of wide spacing is made possible by the utilization of auxiliary carriers of uniform and sturdy construction and to be used normally on that type of track. Transition track stations couple the wide-spaced track to short feeder or delivery tracks with narrowly spaced rolls or rollers, for immediate handling of load-bearing pallets, containers, even uncrated cargo without auxiliary carrier.

An auxiliary carrier may be constructed as load carrying grid on a frame constructed from rails which serve as runners on the wide-spaced roller track. The grid may be mounted on top of the frame, the latter having a square-shaped configuration. Thus, the carrier can be placed on the track in one or the transverse direction.

Lifting equipment is preferably provided in the transition track station, having particular lifting devices coupled to each of the sets of rolls or rollers. In order to minimize the lifting stroke, the wide-spaced track should have position generally at a level lower than the narrow-spaced track. The level difference should be at least equal to the vertical dimension of the auxiliary carrier. As the lifting devices should not lift the heavy load pallets, the lift stroke should be dimensioned accordingly, and particularly the set of narrow-spaced rolls or rollers in the station will only lower a pallet onto the carrier, then being held in the station on and by the set of wide-spaced rollers. The lowering distance is actually only equal to the difference between the said level difference and the vertical carrier dimension.

The transition station is usually associated with a stack of auxiliary carriers which is lifted in steps and with a stroke for each step equal to the carrier thickness. The topmost carrier is rolled onto the wide-spaced rolls or rollers in the station, and then is placed into alignment with the wide-spaced track.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a perspective view, somewhat from the top, of an auxiliary carrier to be used in and as part of the system in accordance with the preferred embodiment of the invention; and FIGS. 2, 3 and 4 show somewhat schematically a transition station as interposed between a narrow-spaced and a wide-spaced roller track in different phases of operation.

DESCRIPTION OF THE DRAWINGS

Proceeding now to the detailed description of the drawings, an auxiliary carrier 1 in FIG. 1 is comprised of a support and a load carrying grid 2, with relatively narrow spacing between the bars of the grid. Particulars of the grid bar spacing will be explained later with reference to the several roller tracks, as there is a definite relation which should be observed.

The grid bars are secured to two transversely dispoed bars 3, having length $a$. The two bars 3 are interconnected by means of longitudinally extending rods 4, together forming a support frame for the grid 2. Rods 4 have length $b$. Elements 3 and 4 have similar vertical dimensions (the frame having horizontal disposition).

Figure 1:
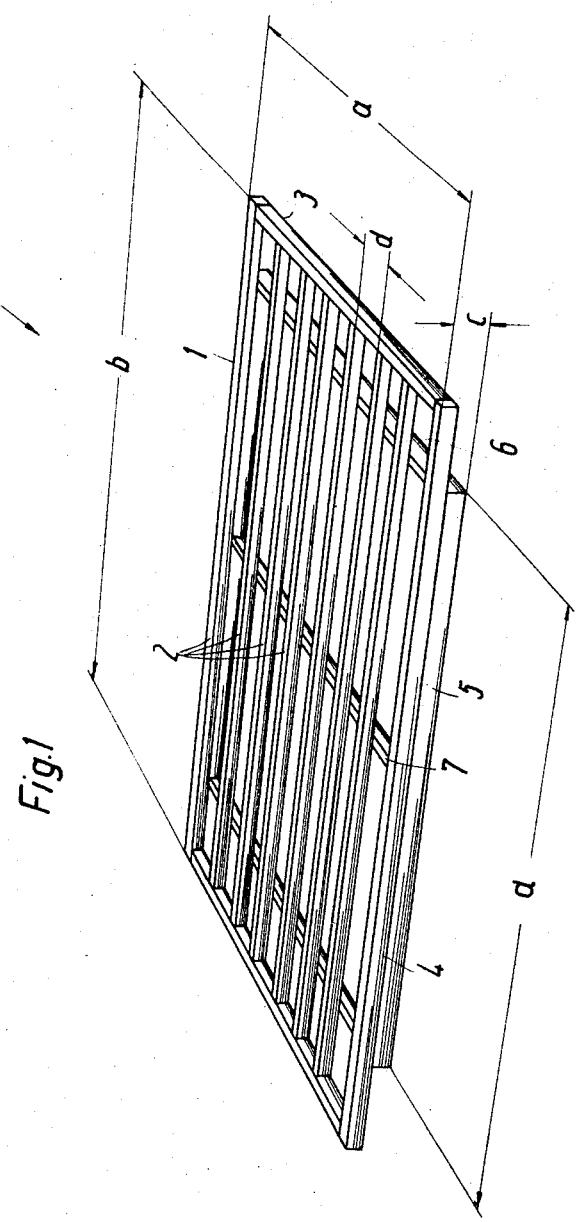

A carrier frame is welded to the grid 2 underneath thereof and having rails 5 which extend parallel to rods 4. Rails 5 may serve as runners or skids on a roller track. THe carrier frame has also transverse rails 6 interconnecting rails 5; there is also provided a central stiffening and support ridge 7. Elements 5, 6 and 7 all have the same length $a$, and rails 6 may also serve as runners so that the carrier may move in either direction.

The rectangular contour of the support grid 2 corresponds to the usual size for airplane pallets, i.e., 8 feet by 10 feet. The narrow denotes the normal direction of carrier movement. Character $c$ denotes the overall vertical dimension for the carrier 1 which is about 160 mm.

Figure 2:
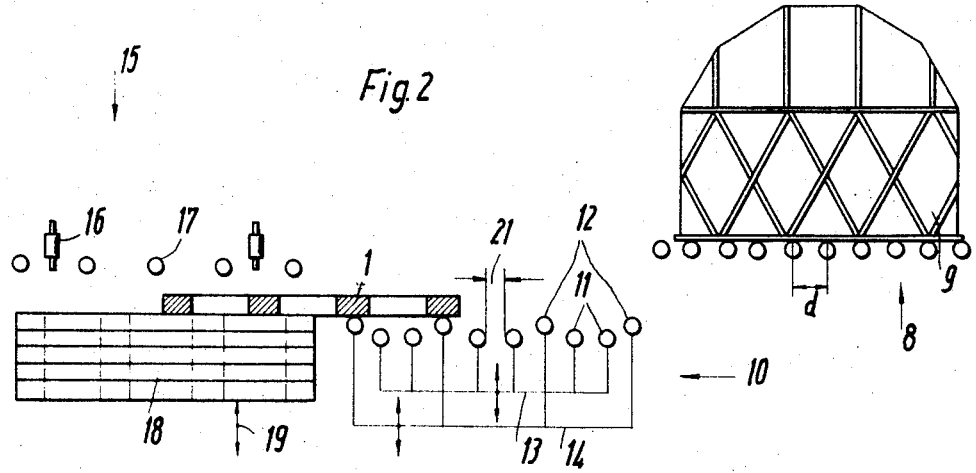
Figure 3:
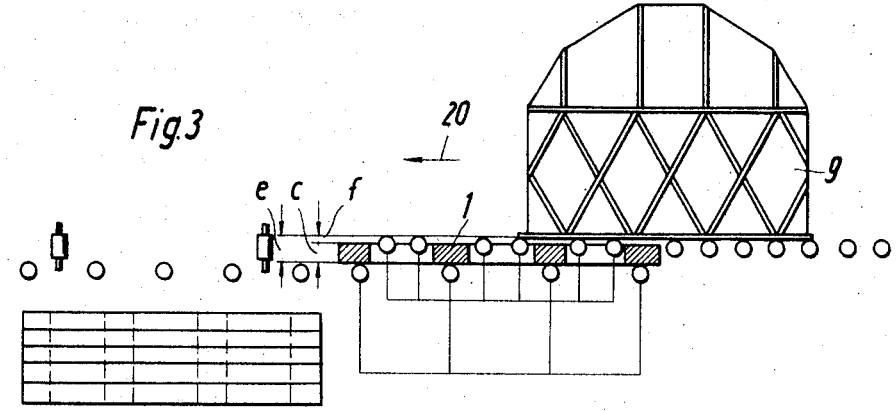
Figure 4:
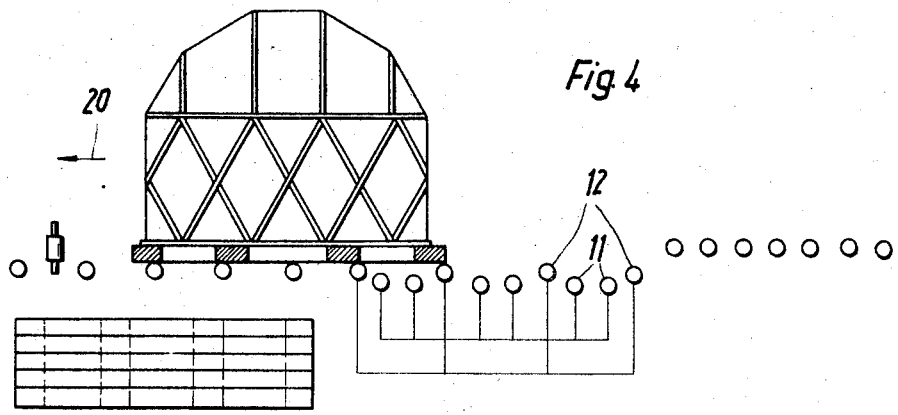

Turning now to FIGS. 2, 3 and 4, these figures illustrate a first roller track 8 with relatively narrow roll or roller spacing. By way of example, the rollers are spaced apart by about 300 mm (about 12 inches). The rollers extend transversely to the plane of the drawing. The track may have plural roller trains, i.e., the individual rollers do not have to cover the entire width of the track. Rather, two or four tracks or trains may be placed next to each other, but the axial spacing here should not exceed 12 inches. This dimension is not critical per se, but presently it is regarded as a suitable dimension for supporting the usual pieces of air freight cargo in sufficiently closely-spaced support points.

As stated above, narrow-spaced track portions of the type denoted with reference numeral 8 cover only short distances in the entire track system. These track portions such as 8 are, for example, provided near the docking and loading facilities for aircraft. FIG. 2 illustrates also a pallet or container 9 having igloo configuration and assumed to have arrived at the end of the illustrated narrow-spaced track 8. Pallet 9 may weigh seven metric tons and may have bottom contour to fit onto an auxiliary carrier as described.

Reference numeral 10 denotes generally a transition track which couples the narrow-spaced track 8 to a track 15 with wider spaced rolls or rollers. The narrow-spaced track 8 terminates in the transition station 10, so does the wide-spaced track 15. Presently, we consider the track 8 as ending in station 10 while track 15 begins therein. The situation could well be reversed; there is also the possibility of operating the station and tracks in either direction.

The transition station includes two staggerdly arranged roller systems or sets of rolls or rollers 11 and 12. These two sets or systems are individually driven as far as the rolls are concerned, and are respectively supported by and on two lifting devices 13 and 14. The lifting equipment is illustrated as two comb-like structures, each comb representing a lifting structure, and the two arrows denote the lifting and lowering function of each such structure.

The interleafing or interdigiting of the two lifting structures is illustrated in that manner for purposes of simplified planar illustration. In reality, the roller system 11 is additionally placed in between two systems 12 of widely-spaced rollers. Moreover, system 11 may include, e.g., two or more parallly disposed track portions, in which rolls or rollers are axially spaced apart to permit passage of the ridge 7 in between, for reasons which will shortly become apparent.

The rollers of the system 11 are equidistantly spaced in direction of rolling, analogous to the spacing of the rollers of track 8. Thus, each one of those rolls of system 11 which is, in the drawing, vertically aligned with a roller of system 12, has been omitted. All rollers of system 11 are uniformly arranged at center-to-center spacing $d$ in direction of rolling so that the rollers of system 11 can traverse the gaps between the bars of grid 2 of an auxiliary carrier. These grid bars, of course, are not wider than the gap 21 between two rollers of track 8.

The two roller systems or set 11 and 12 have position as indicated in FIG. 2 when preparing station 10 for a transfer operation. The rollers 12 have their supporting plane located flush with the bottom of an auxiliary carrier 1 which is the topmost one of a stack 18 of such carriers. The double arrow 19 denotes a lifting device for the stack 18 of carriers, for lifting the stack in steps, and by an incremental height $c$ of each step, after the uppermost carrier has been rolled onto the roller system 12, illustrated in FIG. 2 as being in progress.

The stack 18 is disposed underneath the roller track 15. This track has widely-spaced rollers for the carriers 1. The track has also guide rolls 16 journalled on vertical axes and disposed alongside the track. The rollers 17 of track 15 may actually be fairly small, they may be rolls which are disposed in pairs in the direction normal to the plane of the drawing, with the rolls of a pair being spaced so as to define a track gauge $a$. The track, thus, has actually two trains of rolls, disposed parallel to each other, each supporting one of the two runners 6 of an auxiliary carrier riding thereon; the latter is held on the tracks by operation of the guide rolls 16 which engage the rails 6 laterally. Due to this uniformity in guiding, the load proper may laterally overhang guide rollers 16 and track.

The roller track 15 operates in a level which is below the level of track 8. The level of track 8 is, of course, the level of the bottom and support surface of incoming pallets such as 9. The level difference $e$ between the two tracks 8 and 15 is larger than the vertical dimensions $c$ of an auxiliary carrier, the difference $f$ defining a tolerance and clearance distance whose purpose will shortly become apparent.

Proceeding now to the description of the operation of the system, I refer first to FIG. 2. The direction of transportaion is indicated by arrow 20. The system may be provided near a docking place of an aircraft and is used as part of the equipment for unloading an aircraft. The pallet 9 has been moved from the aircraft on roller track 8 and is about to arrive at the transition or transfer station 10. The uppermost auxiliary carrier 1 of stack 18 is shifted in the opposite direction from underneath track 15, onto the wide-spaced rollers 12. The carrier is to be particularly positioned on the rollers 12 so that the rollers 11 are aligned with the gaps between the bars of support grid 2 of the carrier.

Next, both roller systems 11 and 12 are raised by their respective lifting devices 13 and 14. Suitable limit switches may control stopping and stroke length of the lifting devices, but they do not stop in similar levels. Rather, lifting device 14 raises the roller 12 to be horizontally aligned with track 15 so as to establish an extension thereof into the transition station 10. The rollers 12 carry the auxiliary carrier 1 whose upper supporting surface is now below the support plane and level of pallet bottom by the distance $f$. The rollers 11 have been lifted somewhat higher so that they establish an extension of roller track 8 into the transition station 10. The rollers of system 11, therefor, have penetrated the gaps between the bars of grid 2 of the carrier 1. The plural rollers 11 have also missed laterally the ridge 7 as it extends centrally along the direction 20.

As now rollers 11 are horizontally aligned with track 8, pallet 9 can be rolled onto the rollers 11 (FIG. 3). Subsequently, rollers 11 are lowered again by a stroke larger than $e$ ($=c+f$), but the pallet 9 is lowered by the distance $f$ only and lodges on the carrier 1 as supported on rollers 12. The now load-free rollers 11 are lowered further to clear the carrier. As stated, the bottom of carrier 1 is flush with the roller track 15 due to track alignment of 12 with 15. Now, carrier 1 with pallet 9 can be rolled off rollers 12 and onto track 15 without traversing any gap. (FIG. 4). The carrier 1 is laterally guided by rolls 16 as the carrier with pallet now moves onto and along track 15 in a straight path, where necessary, or in curves if so provided.

It can be seen that the system has been designed so that the lifting devices 13 and 14 operate in the lifting mode without load (except that device 14 has to lift the rather light carrier 1 when empty). Therefore, the lifting devices do not have to be paticularly powerful. The device 14 merely has to lower the pallet for the distance $f$, for placing the pallet onto rollers 12.

As far as overall operation is concerned, it should be mentioned that the transition station should always hold a carrier 1 in readiness, and the rollers 11 and 12 may actually have a normal position as shown in FIG. 3. The pallets 9 or other load may arrive irregularly, but an incoming pallet 9 should roll onto the rollers 11 without delay, whereupon the rollers 11 lower the pallet onto the carrier 1 which can then be rolled off the station immediately. As the lowering stroke $f$ can be quite small, the pallet may actually pass through the station without delay. After the loaded pallet has been rolled out of the station 10, rollers 11 and 12 are lowered to receive another carrier whereupon the rollers 11 and 12 resume a waiting position as shown in FIG. 3.

After all or most of the carriers 1 have been taken from the stack, the stack is replenished by returning, for example, unused carriers from a transition station that operates in the reverse, or by collecting and returning them in another manner. The carrier stacks can be trucked and do not require a special conveying system. Placement of a new stack in station 10 does not provide any delay in the track operation. The loaded carriers can be lifted off the wide-spaced track 15 at its other end by means of fork lifters, and the pallet is then taken off the carrier by means of conventional shelf-storing equipment.

As stated, the carriers 1 are constructed with two sets of transversely oriented runners 5 and 6, so that they are suitable for transportation in one or the other direction. Conveyor tables that change the direction of travel may be interposed in the wide-spaced track 15 and as a part thereof. The wide-spaced track 15 may, therefore, be a portion of a large system with branch lines, loops, etc.

The carriers 1 can also be used in combination in that, for example, two of them cooperate to take up a long piece of freight, such as a 20 foot container. If such a possibility exists, the transition station 10 should be long enough to handle two carriers at once.

As stated, the system 11 may not have necessarily rollers, but may have disk-shaped rolls disposed in axial alignment and at a spacing equal to spacing 21. In such a case, carriers 1 may be handled by the transition station even if turned by 90°, with bars 5 serving as runners. Such rolls will reach through the gaps of the grid 2 in either case, i.e., in either orientation of the grid. If a slight lifting of loaded pallets is not to be excluded, the entire device can readily be run in the opposition direction.

As all carriers 1 have similar construction, the sides of bars 5 or 6 can readily serve consistently for affixing encoding labels or bars, so that the entire system can be run under computer control.

The invention is not limited to the embodiments described above but all changes and modifications thereof not constituting departures from the spirit and scope of the invention are intended to be included.

I claim:

1. Conveyor system for pallets, containers, or the like, in aircraft terminals, comprising: a first track with relatively closely spaced rolls or rollers; a plurality of similar auxiliary carriers of perforated construction; a second track with relatively widely spaced rolls or rollers for moving the auxiliary carriers, the second track being provided with lateral guide means for the auxiliary carriers; and a transition station having two sets of rolls or rollers, a first set having said close spacing, the second set having said wide spacing, at least one of the first set and second set mounted for independent lifting and lowering, the sets being respectively positionable to serve as extensions for the first and second tracks into the transition station; the carriers having perforations so that the rolls or rollers of the first set can reach through the perforations for lowering a pallet, container, or the like onto the carrier.

2. System as in claim 1, wherein the first track is disposed at a higher level than the second track, the level differenc being not smaller than the vertical dimension of a carrier of the plurality.

3. System as in claim 2, the first level being slightly higher than said vertical dimension, there being first and second lifting devices respectively for the first and second sets of rolls or rollers, the first lifting device for lowering a container or pallet onto a carrier when seated on the second set of rolls or rollers, the second lifting device for lifting the second set of rolls or rollers into alignment with the second track.

4. System as in claim 3, wherein a stack of carriers is provided with the uppermost one in a different level, the second lifting device placing the second set of rolls or rollers into alignment with the uppermost carrier, for receiving the carrier and to be placed into alignment with the second track.

5. System as in claim 1, wherein the carriers of the plurality include a support grid and carrier frame, the carrier frame constructed from bars at a spacing to be seated on the second track, the grid constructed to permit traversing in the rolls or rollers of the first set.

6. System as in claim 5, wherein the grid is mounted on the frame, the frame having square-shaped configuration.

* * * * *

UNITED STATES PATENT OFFICE
CERTIFICATE OF CORRECTION

Patent No. 3,756,436          Dated September 4, 1973

Inventor(s) Gerhard Lingg

It is certified that error appears in the above-identified patent and that said Letters Patent are hereby corrected as shown below:

On the cover sheet insert item -- [30] Foreign Application Priority Data:

July 29, 1972         Germany        P 21 37 910.2 --.

Signed and sealed this 2nd day of April 1974.

(SEAL)
Attest:

EDWARD M. FLETCHER, JR.         C. MARSHALL DANN
Attesting Officer             Commissioner of Patents